United States Patent [19]

Thomas et al.

[11] 4,178,202

[45] Dec. 11, 1979

[54] METHOD AND APPARATUS FOR FACILITATING THE DISPOSAL OF CUTTING LIQUID

[75] Inventors: Georges Thomas, Fontenay le Comte; Henri Nicol, Garancieres, both of France

[73] Assignee: SKF Compagnie d'Applications Mechaniques, Clamart, France

[21] Appl. No.: 791,252

[22] Filed: Apr. 27, 1977

[30] Foreign Application Priority Data

Apr. 28, 1976 [FR]  France ............................. 76 12579
Apr. 21, 1977 [FR]  France ............................. 77 12100

[51] Int. Cl.² ........................................... B01D 1/14
[52] U.S. Cl. ...................................... 159/15; 159/15; 159/47 WL; 159/16 A; 196/128; 208/179
[58] Field of Search ............... 159/13, 16 A, 16 R, 159/15, 47 WL, 48 L, 49; 202/234, 236; 203/49; 196/128; 208/39, 187; 110/238

[56] References Cited

U.S. PATENT DOCUMENTS

| | | | |
|---|---|---|---|
| 1,518,684 | 12/1924 | Benge | 196/128 |
| 2,049,247 | 7/1936 | Burkhard | 159/15 |
| 2,166,193 | 7/1939 | Woodworth | 196/128 |
| 3,206,379 | 9/1965 | Hill | 159/16 R |
| 3,257,291 | 6/1966 | Gerber | 203/49 |
| 3,425,914 | 2/1969 | Kanaan | 203/49 |
| 3,920,505 | 11/1975 | Helleur | 159/49 |

*Primary Examiner*—Norman Yudkoff
*Attorney, Agent, or Firm*—Beveridge, DeGrandi, Kline & Lunsford

[57] ABSTRACT

A method of facilitating the disposal of waste cutting liquid consisting essentially of an emulsion of partly soluble oils and water comprises subjecting a trickling flow of the liquid to the action of a current of hot air at a temperature of from 80° to 250° C. and thus evaporating the water from the liquid. Insoluble oils may be removed from the liquid by decantation before the liquid is subjected to the current of hot air. Preferably the oil which remains after the water has been evaporated from the liquid is used as fuel in the heating of the hot air so that the oil is disposed of. Apparatus for carrying out this method comprises an evaporation tower containing a series of plates alternately inclined in opposite directions to the horizontal and arranged one beneath the other to permit a trickling zig-zag flow of the cutting liquid over the plates from the top plate to the bottom plate in the series. Means are provided for supplying the liquid to the top plate and for causing a current of hot air at a temperature of from 80° to 250° C. to flow over the surface of the trickling flow of liquid over the plates.

8 Claims, 5 Drawing Figures

METHOD AND APPARATUS FOR FACILITATING THE DISPOSAL OF CUTTING LIQUID

This invention relates to a method of and to apparatus for facilitating the disposal of waste cutting liquids consisting essentially of emulsions of partly soluble oil and water, and which may contain a substantial proportion of soluble oils accompanied by various solid residues. Generally, the liquids which are used for cooling and lubricating cutting tools during the machining of metal components contain approximately 90% of water and 10% of an oily phase partially soluble in the water.

The disposal of these cutting liquids after they have been used presents a number of problems, in particular when the volume of the liquid wastes is large and it is necessary to reduce as far as possible the pollution caused by the discharged waste and also the pollution of the environment generally.

A number of processes for facilitating the disposal of these cutting liquid wastes have already been proposed. Thus, it has already been proposed that use may be made of ultrafiltration processes or of chemical dissociation of the elements which constitute the waste in order that they can be more easily disposed of. The chemical dissociation methods require modifications to the proportioning of the products used in the dissociation or even the use of different products, in dependence upon the composition of the liquid wastes to be treated. Consideration has also been given to the incineration of the cutting liquid wastes, with partial recovery of the combustion heat by means of heat exchangers. The pollution of the environment and notably the pollution of the air resulting therefrom constitutes, however, a considerable disadvantage of this type of process.

The idea has also been considered of operating at high temperature so as to vaporise the water contained in the cutting liquid wastes in thin film evaporators, in which the liquid is maintained in the form of a thin film on the internal surface of a tube which is heated by steam. This process, which utilises high temperature evaporation associated with partial thermal dissociation, possesses the disadvantage of producing, after condensation, water which still contains volatile products such as kerosene. Moreover, it is necessary to have available a considerable energy source for raising the temperature for the purpose of vaporisation.

The aim of the present invention is to provide a method of facilitating the disposal of waste cutting liquid consisting essentially of an emulsion of partly soluble oils and water, which is less onerous to carry out than existing methods and which prevents or reduces pollution of the environment.

According to the invention, such a method comprises subjecting a trickling flow of the liquid to the action of a current of hot air at a temperature of from 80° to 250° C. and thus evaporating the water from the liquid. Preferably the hot air is at a temperature of from 90° to 200° C.

The oil and water separation is thus not carried out, as has been, by vaporisation of the water alone at a high temperature but by lower temperature evaporation into the air current, that is to say by transference of the water molecules to the current of hot air which receive water in the form of water vapour until it is saturated. It is thus possible to operate the method at low temperature, in such a manner that thermal dissociation of the oily phase does not occur and such that no evaporation of the most volatile constituents, such as kerosene, and sulfurized or chlorinated additives, is observed. The vapor rejected does not contain any volatile products and complete depollution is achieved.

The insoluble oils contained in the liquid are preferably removed from the liquid by decantation before subjecting the liquid to the action of the current of hot air.

In order to reduce the operating costs, preferably the oil remaining after evaporation of the water is used as fuel in the heating of the hot air and the oil is thus disposed of.

In one preferred example of the method, before subjecting the liquid to the action of the current of hot air, insoluble oils are removed from the liquid by decantation and a preliminary evaporation of water is effected by a current of air at ambient temperature in direct contact with a free surface of the liquid in a container.

It is also possible, with advantage, to carry out after the hot air evaporation, a further separation by decantation of part of the liquid. This preferably takes place after an optional centrifuging operation. It is found, in fact, that the subjection of the liquid to the hot air evaporation causes a physical transformation of the emulsion, which can with advantage be used to the benefit of improving the separating action.

Part of the liquid may be recycled after it has been subjected to the action of the current of hot air, so that the recycled liquid is subjected more than once to the current of hot air.

The invention also consists, according to another of its aspects, in apparatus for carrying out the method in accordance with the invention, the apparatus comprising an evaporation tower containing a series of plates alternately inclined in opposite directions to the horizontal and arranged one beneath the other to permit a trickling zig-zag flow of the cutting liquid over the plates from the top plate to the bottom plate in the series, means for supplying the liquid to the top plate and means for causing a current of hot air at a temperature of from 80° to 250° C. to flow over the surface of the trickling flow of the liquid over the plates.

Preferably, the means for causing the current of hot air to flow over the liquid comprises means for blowing the air into an upper part of the evaporation tower in a direction transverse to that of the trickling flow of the liquid over the plates, manifolds in the walls of the tower to permit the direction of flow of the air to be reversed and cause the air to flow to and fro across the tower and means for removing the air containing evaporated water from the lower part of the tower.

In one example, the apparatus includes decanting means comprising a plurality of tanks connected together in series, each tank having an outlet pipe leading from its lower part into the next tank in the series and discharging into the next tank at a level below the surface level which exists in that tank in operation, means for supplying the liquid to the first tank in the series and pumping means having an inlet disposed at the level of the surface of the liquid in each tank to decant insoluble oil from the surface of the liquid in the tank. In one embodiment, which enables starting-up of the apparatus to be facilitated, a series of settling tanks which may be the same as the above tanks is also placed downstream of the evaporation tower.

After its passage through the evaporation tower, the liquid which, at this stage, consists mainly of oil may be fed to a further separation device, which separates solid residues and tars from a composition of the remaining combustible products. The apparatus then further comprises a burner cooperating with a blower for producing hot air, means for supplying the liquid from the separation device to the burner and means for supplying hot air from the burner and blower to the evaporation tower. The result is that the operating costs of the method and apparatus in accordance with the invention are remarkably low, since the burner is supplied, either totally or to a considerable extent, with combustible oil coming from the waste cutting liquid, the disposal of which is made possible by the method and apparatus of the invention. A further fuel that may be required may consist of oil removed from engines, machines or vehicles which may be those operating in the factory in which the cutting liquid is used.

Another preferred example of the apparatus includes a storage vessel having an open top and a length and width which are large compared with its depth and means for supplying the liquid to the storage vessel, the storage vessel acting to steady the flow of the liquid to the evaporation tower and causing water to be evaporated into the atmosphere from the surface of the liquid in the vessel. The vessel may be surmounted by a roof spaced from the top of the vessel and at least one blower is then provided for producing a flow or air between the roof and the surface of the liquid in the vessel. This provides a preliminary evaporation of water from the liquid and to improve this preliminary evaporation still further, a plurality of trickler tanks are disposed between the top of the storage vessel and the roof and means are provided for supplying liquid from the storage vessel to the trickler tanks whence the liquid overflows from the tanks back into the storage vessel and forms a plurality of curtains of liquid substantially normal to the flow of air between the surface of the liquid in the vessel and the roof.

One preferred embodiment of the apparatus comprises a decanting or settling apparatus supplied from the outlet from the evaporation tower and connected to the aforementioned storage and decanting vessel. In this way, the liquid wastes to be treated may be partially recycled into the evaporation tower.

The separating device which carries out separation of the solid residues and tars and preparation of the remaining combustible products intended for supplying the burner may be supplied with liquid taken from the surface of the liquid in the storage and decanting vessel. The liquid is preferably drawn from a position opposite to an inlet into the storage vessel for the non-treated cutting liquid. In the same way, a return duct into the storage vessel for the liquid treated in the evaporation tower may be disposed close to the aforementioned liquid take-off position and opposite to the inlet for the untreated cutting liquid. Moreover, the circulation of the preliminary evaporation air produced by the blowers is preferably directed from that side of the tank, at which the untreated cutting liquid is supplied to the vessel towards that side of the vessel at which the take-off position for treated liquid and the return for the treated liquid are situated.

In this way, a supplementary effect is obtained of physical movement of the oily phase floating at the surface of the vessel by the flow of the preliminary evaporation air.

Two examples of methods and of apparatus in accordance with the invention will now be described with reference to the accompanying highly diagrammatic drawings, in which.

Figure 1:
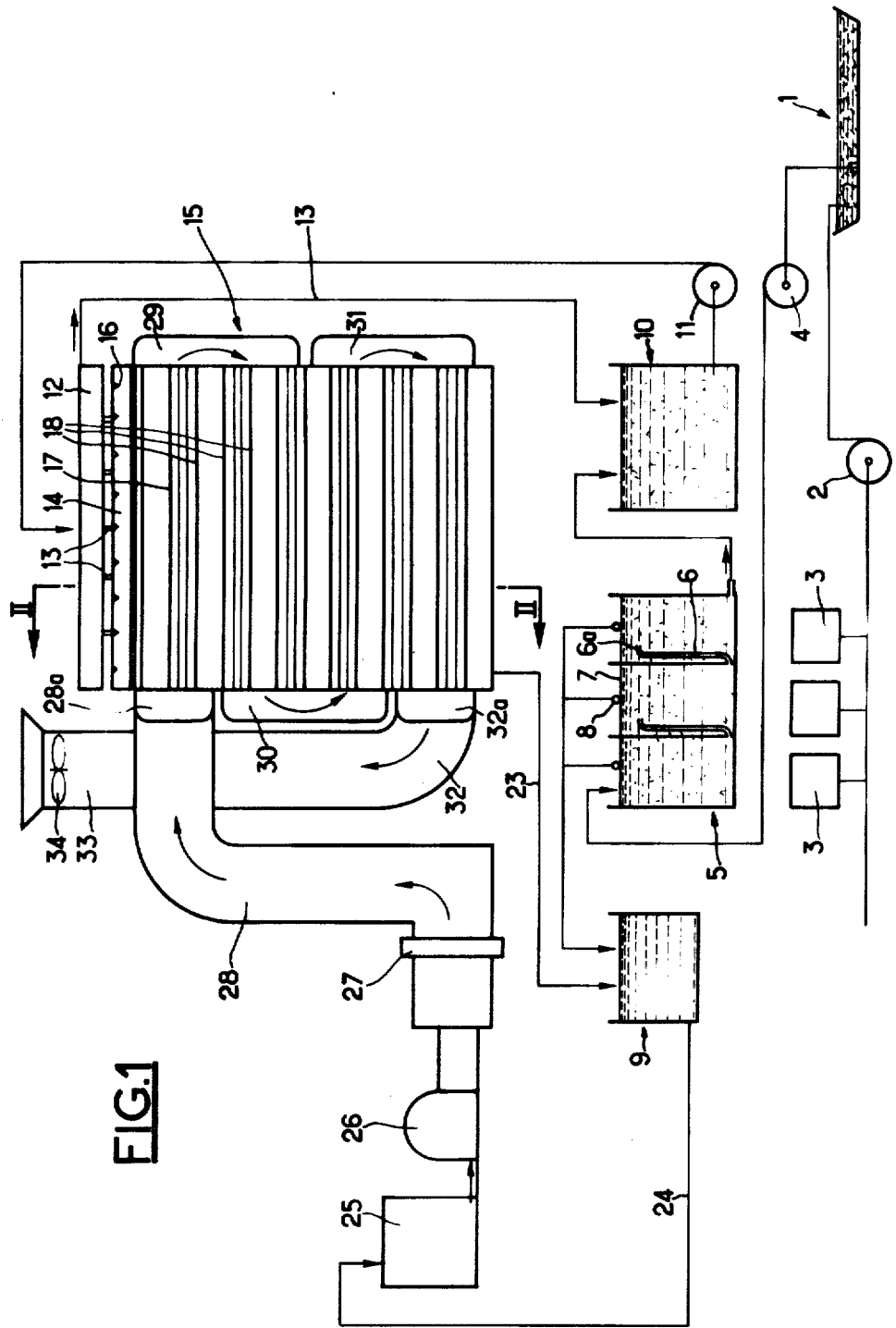
FIG. 1 is a side view of one example of the apparatus.

The apparatus shown in FIG. 1 comprises first of all, following the path of the cutting liquid waste to be treated for disposal, a storage vessel 1, which is supplied with the liquid by a pump 2 which collects the cutting liquid discharged from a number of cutting machines which are indicated by the reference numerals 3. The liquid at this stage consists of an emulsified mixture, containing a high proportion of water, amounting to up to 90% to 95%, the remainder being oils, to a great extent soluble, which may be mineral oil, synthetic or semi-synthetic oils, and a small proportion of heavy, insoluble oils and also some solid waste from the machining operations.

The storage vessel 1 is preferably shallow and of a large area in plan and is exposed to the air, to permit a preliminary removal of the water by natural evaporation. The principal function of this storage vessel is, however, to permit a steady supply to the remainder of the apparatus even when the flow rate of liquid waste is irregular and depends upon working conditions as is usual.

Figure 2:
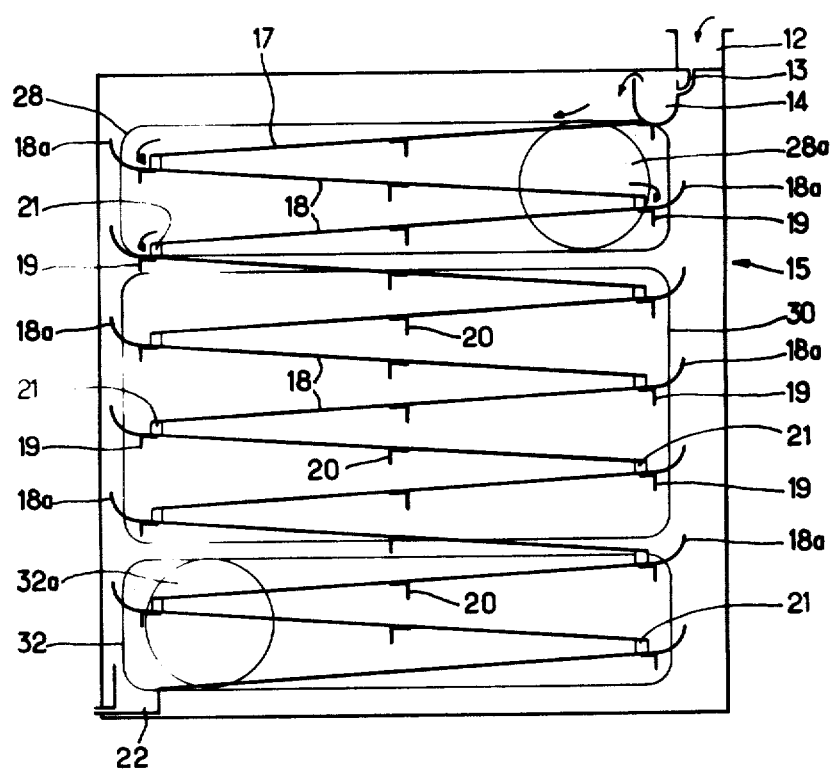
FIG. 2 is a section on the line II—II of FIG. 1, showing internal details of an evaporation tower forming part of the apparatus.

A pump 4 draws liquid from the storage vessel 1 and supplies it into a decanting or settling apparatus, referenced 5 as a whole. This comprises a number of tanks connected together in series, of which only three are shown in FIG. 1. Each of these tanks comprises, in its lower region, an outlet duct 6, which ascends to the interior of the following tank, the upper end of the duct 6, bearing the reference 6a, remaining below the level 7 of the liquid in the following tank. A suction device, constituted by a single pipe 8 in the example of FIG. 1, is situated exactly at the surface of the liquid in each of the tanks and enables such of the insoluble oils as rise to the surface of each of the settling tanks to be decanted. A suction device, not shown in FIG. 1, delivers these insoluble oils into a feed tank 9. After it has passed through the whole assembly of settling tanks 5, the cutting liquid extracted from the bottom of the last settling tank is introduced into the upper part of a feed tank 10, from which a pump 11 delivers it into a supply trough 12, equipped with an overflow to a return duct 13 leading back to the feed tank 10. The trough 12, which is shown also in FIG. 2, is connected by a plurality of ducts 13 situated in its lower part to a channel 14, extending across the entire width of an evaporation tower indicated generally by the reference numeral 15. The channel 14 has, throughout its length and on the opposite side from the feed ducts 13, a plurality of notches 16 enabling the cutting liquid to overflow out of it. This liquid falls on to a first inclined plate 17, the slope of which is small and on which it flows in a trickling manner to form a film or thin layer over the plate.

When the liquid has thus travelled over the entire surface of the upper plate 17 and has arrived at the edge furthest from the channel 14, it falls onto a second plate 18, also slightly inclined but in the opposite direction from that of the plate 17. The plate 18 preferably has on its front edge a curved flange 18a, which prevents any spilling over of liquid coming from the first plate 17 and thus ensures the correct passage of the trickling flow of liquid over all the plates.

As can be seen in FIG. 2, the evaporation tower 15 comprises a large number of inclined plates, the inclinations being alternate such that the liquid to be treated trickles in a zig-zag path from the top plate to the bottom plate of the tower. The different inclined plates 18 are fixed in a suitable manner to the walls of the evaporation tower 15 and are supported by cross-beams such as 19 in the vicinity of their ends and 20 near their middles. Spacing devices 21 maintain a suitable distance between the extreme edges of the various inclined plates 18, while permitting the passage of the liquid. It should be noted that the inclination of the plates 18 is slight and should simply be sufficient to enable a steady flow of liquid to occur. In practice, the inclination ranges from 2 to 6%. The inclination of the different plates may be either equal or different, depending upon their position inside the evaporation tower 15, taking into account the temperature of the hot air, which varies according to the height in the evaporation tower, as will be seen later.

After the liquid has passed from top to bottom over the different plates 18 of the evaporation tower 15, it is collected by a removal trough 22 situated at the bottom of the tower 15. A duct 23 conducts away the treated liquid into a feed tank 9 for a burner. At this stage, the treated liquid contained in the feed tank 9 consists entirely of oil, the water contained in the initial mixture having been removed in the evaporation tower 15 as will be described below. In order to facilitate the starting up of the apparatus, during which the rise in temperature of the evaporation tower is progressive, it is preferable to replace the feed tank 9 by a decanting or settling apparatus, not shown in the drawings, comprising a number of tanks connected in series by pipes which keep below the liquid level in the same manner as in the settling apparatus 5. The feed tank 9 is connected by a duct 24 to a conventional device 25, which permits the treatment of used oil or oil from oil changes having a composition analogous to that of the oil in the feed tank 9. These oils are treated by the device 25 so as to separate the solid residues and tars from the combustible products, which are then supplied to a burner 26, cooperating with an air blower 27 to produce hot air. The hot air thus obtained passes along a duct 28, which is connected to one of the side walls of the evaporation tower 15 by means of a manifold 28a extending across the entire width of the tower. The inlet from the duct 28 and manifold 28a is also shown in thin lines in FIG. 2. It can be seen that the hot air enters the upper part of the evaporation tower 15 across the entire width of the tower and in a direction substantially perpendicular to that of the trickling flow of liquid coming from the channel 14 and flowing over the upper plate 17 and the lower plates 18. The hot air current, the temperature of which at the instant of its entry into the evaporation tower is from 250° to 180° C. passes across the entire width of the evaporation tower 15 from left to right as seen in FIG. 1, that is to say perpendicularly to the plane of FIG. 2. The hot air current is accepted by a manifold 29 occupying the entire width of the tower 15 and opposite to the manifold 28a, the air thus being directed into a new pass across the interior of the evaporation tower in a direction opposite to its first pass. Manifolds 30 and 31, situated on opposite sides of the evaporation tower 15 and having the same configuration as the manifold 29, each bring about the same reversal of direction in the current of hot air. After a number of passes in the interior of the evaporation tower in a direction perpendicular to that of the trickling flow of the cutting liquid, the hot air which becomes cooled by contact with the liquid and which is charged with water vapour, is removed by a manifold 32a, identical to the manifold 28a, and by a pipe 32, connected to a chimney 33 having an extraction fan 34.

Depending upon the positions of the various plates 18 inside the evaporation tower 15, it can be seen that the flow of liquid is subjected to hot air at different temperatures and it can be envisaged therefore that the inclination of the plates may be varied depending upon their position in such a way as to improve the efficiency of the apparatus.

Upon leaving the evaporation tower 15, the hot air, the temperature of which is now only from 80° to about 90° C., can be discharged to atmosphere, since it is simply charged with water vapour during its passage through the evaporation tower 15. It should be noted that, as a result of the low temperature of the hot air in the evaporation tower 15 and the simple surface contact, the rise of temperature of the oily liquid to be treated remains low and the maximum temperature of the liquid is below the evaporation temperature of the most volatile oily constituents of the liquid. The result is that the air discharged to the atmosphere is effectively free from any dangerous volatile composition or pollutant.

The use of the oil recovered at the liquid outlet from the evaporation tower 15 for supplying the burner 26 moreover enables the operating costs of such a treatment apparatus to be considerably reduced.

Figure 3:
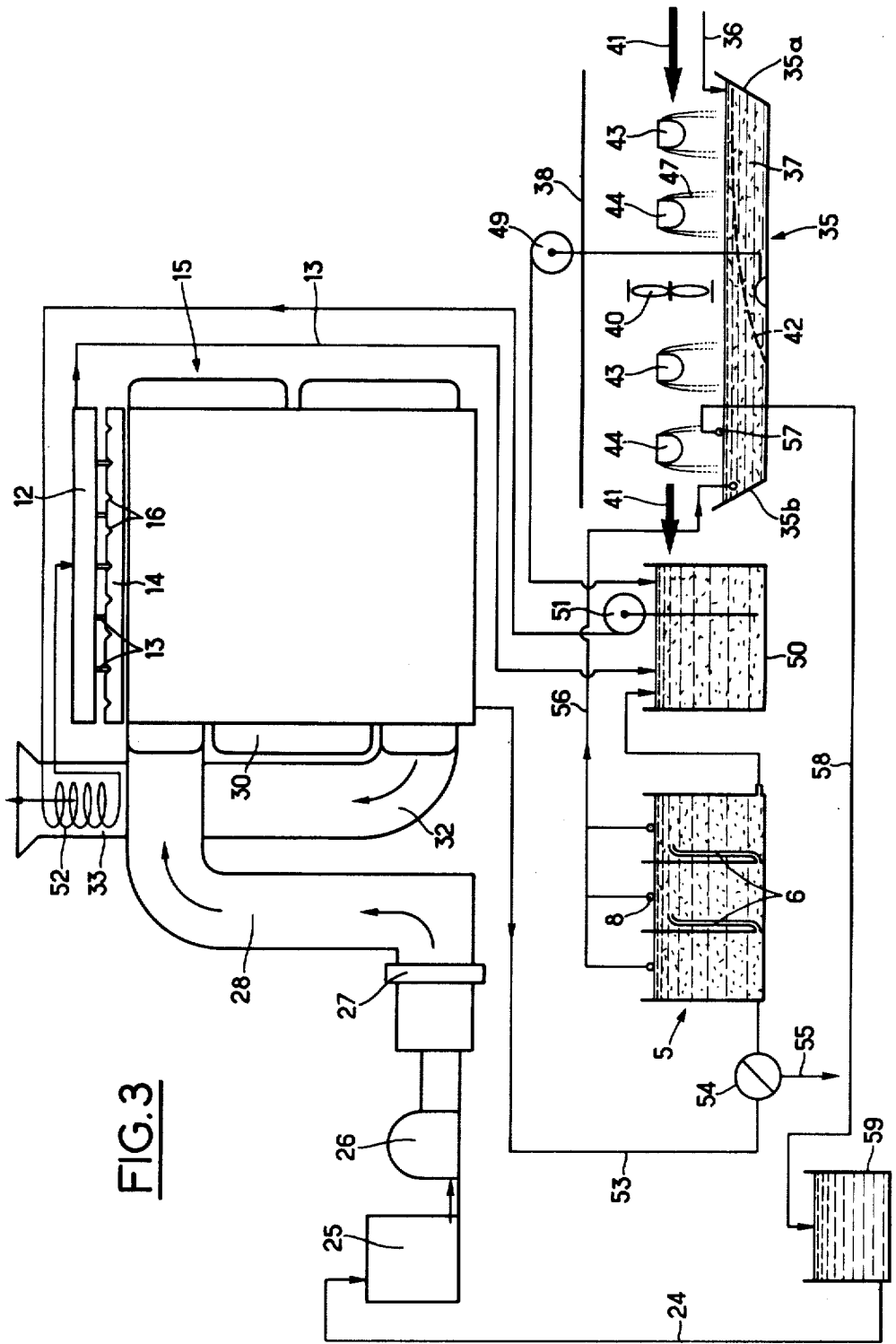
FIG. 3 is a side view of a second example of the apparatus.

The example illustrated in FIG. 3 is a preferred variant of the installation illustrated in FIG. 1. Identical elements bear the same reference numerals. It can be seen from FIG. 3 that the apparatus comprises firstly, following the path of the waste cutting liquid to be treated, a storage and decantation vessel 35, which is supplied through a duct 36, carrying the liquid coming from a number of cutting machines not shown in the drawings. It will be noted that the entry from the duct 36 takes place at the surface of the liquid 37 and near a side 35a of the vessel 35. The liquid supplied through the duct 36 consists of an emulsified mixture containing a high proportion of water which may reach 90 to 95%, the remainder being oil, which is largely soluble and which may be mineral oil, synthetic or semi-synthetic oils, and a small proportion of insoluble heavy oil. The liquid also contains some solid waste from the cutting operations.

Figure 4:
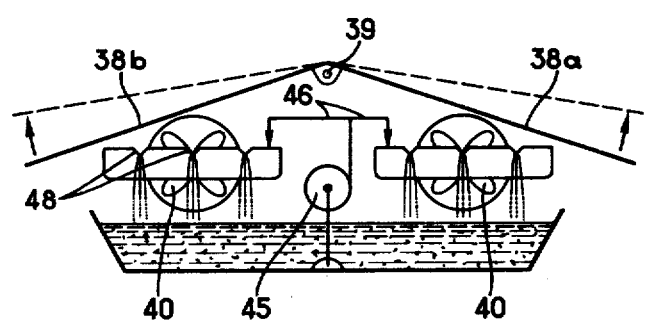
FIG. 4 is a side view of a storage and decantation vessel forming part of the apparatus shown in FIG. 3; and, FIG. 5 is a view from above of the storage and decantation vessel of FIG. 4, with a roof removed.
Figure 5:
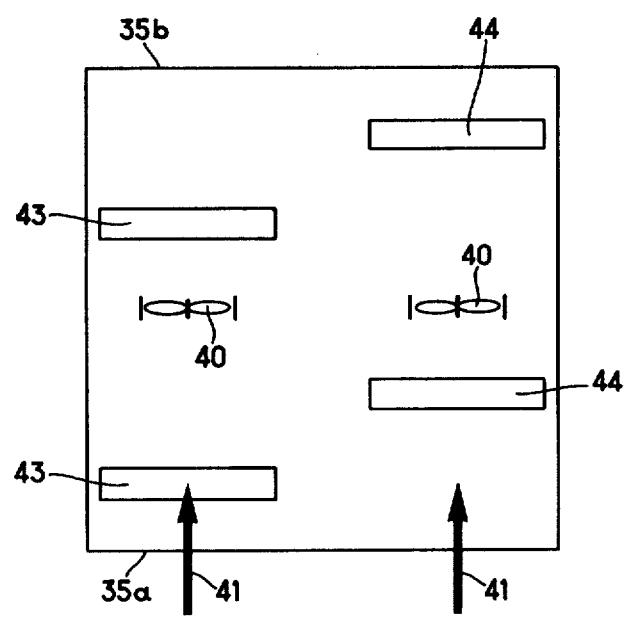

The storage vessel 35 is preferably shallow and of large plan area and is situated in the open air so as to enable a preliminary removal of water by natural evaporation to take place. In order to improve this preliminary evaporation, the vessel is surmounted by a roof 38, preferably formed of a material which absorbs the rays of the sun, for example a blackened metal plate, so as to heat up the atmosphere between the roof 38 and the surface of the liquid 37. To improve this use of solar energy, the roof 38 preferably has two surfaces 38a and 38b, slightly inclined and connected at their adjacent edges to a pivoting axis 39 parallel to the longitudinal axis of the vessel 35, as can be seen in FIG. 4. Means may be provided for varying the inclination of the plates 38a and 38b in such a manner as to vary with the inclination of the sun to the horizon, in order to capture the maximum of radiation. Two blowers 40 are disposed between the roof 38 and the vessel 35, side by side so as to create an air circulation as shown by the arrows 41 in the direction of the longitudinal axis of the vessel 35. As can be seen in FIGS. 3 and 5, this circulation of air is effected from the side 35a of the vessel 35 towards the opposite side 35b. The result is that the air circulation thus produced causes a mechanical entrainment effect of the oily phase which is situated at the free surface of the liquid 37, towards the side 35b of the vessel 35. This displacement effect of the oily phase is added to the settling effect, so that the interface between a more especially oily phase and a more especially aqueous phase or emulsified phase becomes established as shown in FIG. 3 by a dotted line 42. This interface 42 separates the vessel 35, as seen in transverse section in FIG. 3, into one portion situated towards the side 35a and containing principally the aqueous emulsified phase, and secondly a portion situated near to the opposite side 35b and containing principally the oily phase.

In order to improve the preliminary evaporation, the apparatus comprises, in the example of FIGS. 3 to 5, four trickling tanks 43 and 44 in the form of troughs supplied with waste liquid from the vessel 35 by a pump 45 and pipes 46 (see FIG. 4). The tanks 43 and 44 overflow through notches 48 formed at regular intervals along the lateral walls of the tanks 43 and 44 to form two liquid curtains from each tank. The tanks 43 and 44 are disposed in such a manner that the curtains of liquid 47 are substantially perpendicular to the air circulation indicated by the arrows 41. As can be seen in FIG. 5, two trickler tanks are associated with each of the blowers. The tanks 43, corresponding to one of the blowers, are preferably disposed in a staggered pattern with respect to the tanks 44 corresponding to the other blower, so as to favour the draught of air circulating between the roof 38 and the vessel 35. As can be seen in FIG. 3, a pump 49 sucks the machining liquid from the bottom of the tank 35 substantially at its centre and delivers it into a feed tank 50, which fulfils the function of steadying the supply of liquid to the apparatus. A pump 51 takes the liquid from the tank 50 and delivers it into a heating coil 52 situated in a chimney 33. Following upon this heating, the liquid is introduced into the supply trough 12 having an overflow and a return duct 13 to the feed tank 50. The trough 12 is connected by a plurality of ducts 16 located in its lower part to a channel 14, extending across the entire width of an evaporation tower 15. The channel 14 has along its entire length and on the side opposite to the feed ducts 13, a plurality of notches 16 from which the liquid overflows.

The liquid then trickles over the different inclined plates of the evaporation tower 15, which is identical to that described above with reference to FIGS. 1 and 2. Upon leaving the evaporation tower 15, the liquid is conducted through a duct 53 to a centrifuge 54, which enables a partial separation of the oils from any water which may remain to be carried out. It is found, in fact, that the passing of the emulsion through the evaporation tower 15 causes, upon contact with the hot air, a change in the physical state of a portion of the oils from the emulsion permitting this separation in centrifuge to be effected. Any remaining water extracted from the emulsion is removed by the pipe 55, while the remaining oily phase is introduced into the lower part of the settling apparatus 5.

The apparatus 5 is analogous to the apparatus described above with reference to FIG. 1 and comprises a number of tanks connected in series. A suction device 8 situated just at the level of the liquid in each of these tanks extracts the insoluble oils ascending to the surface of the tanks and delivers them through the pipe 56 into the storage and decantation vessel 35 slightly below the free surface of the liquid and in the immediate vicinity of the side 35b of the vessel 35.

The liquid coming from the lower part of the last settling tank of the apparatus 5 is reintroduced into the feed tank 50. It will therefore be seen in this way that the liquid is partially recycled to the inside of the evaporation tower 15 so that it is subjected to several successive treatments.

A suction device, represented by a pipe 57, is situated at the free surface of the liquid 37 in the storage and decantation vessel 35 near the side 35b of this vessel, that is to say opposite to the untreated liquid inlet at 36. The suction pipe 57 supplies, through the pipeline 58, a waiting tank 59. The waiting tank 59 is connected by a pipeline 24 to the equipment 25, permitting the treatment of the used oils or oils from engine changes possessing a composition analogous to those of the oils obtained after the cutting liquid. The burner 26 co-operates as already described with reference to FIG. 1 with an air blower 27 to introduce hot air through a pipe 28 into the evaporation tower 15.

It will be noted that the percentage of combustible oil in the liquid introduced into the upper part of the evaporation tower 15 can be modified, by acting upon the pre-evaporation phase of the liquid contained in the storage vessel 35. In practice, it is found that it is possible to determine a limiting percentage of combustible oil contained in the liquid introduced into the upper part of the evaporation tower 15 in order to obtain total self-sufficiency of the apparatus, the combustible oil recovered being then sufficient for producing the hot air necessary for the treatment in the evaporation tower, without it being necessary to add fuel from external sources for the burner. In these circumstances the apparatus may with advantage be designed so as to permit a regulation of the rotational speed of the blowers 40 and/or of the slope of the sides of the roof 38, so as to increase or decrease the preliminary evaporation carried out on the liquid 37 in the storage vessel 35, thus maintaining the proportion of combustible oil substantially constant.

We claim:

1. A method for the disposal of waste cutting liquid consisting essentially of an emulsion of partly soluble oils and water, said method comprising the steps of:
   preliminary evaporating a part of water from said liquid in a shallow storage vessel defining a large free surface of said liquid in direct contact with air at ambient temperature,
   permitting said liquid to settle for removal of insoluble oils from said liquid by decantation,
   removing said insoluble oils from the surface of said settled liquid and delivering them to a treating device for separating the solid residues and tars from the combustible products,
   flowing said liquid from the bottom of said settled liquid to the top of an evaporation tower,
   causing said liquid to flow through the eavporation tower in a thin trickling stream submitted to a transverse current of hot air maintained at a temperature which will not evaporate the most volatile oily constituents of said liquid, said liquid remaining at a temperature below the evaporation temperature of the most volatile oily constituents thereof, whereby said air is only charged with water vapor and may be directly discharged to the atmosphere, delivering the liquid collected at the bottom of the evaporating tower to said treating device for separating the solid residues and tars from the combustible products, burning said combustible products, and producing said current of hot air from heat produced from burning said combustible products.

2. The method of claim 1 wherein said step of permitting the liquid to settle is performed after performing the additional step of flowing the liquid from the storage vessel to a settling tank which holds said settled liquid.

3. The method of claim 1 wherein the liquid collected at the bottom of the evaporating tower is decanted in a settling tank and fed to said shallow storage vessel before being delivered to said treating device.

4. The method of claim 1 including the steps of flowing a plurality of curtains of said liquid into the shallow storage vessel, said curtains being located above the liquid surface of said shallow vessel, and circulating a flow of air above said liquid surface and through said curtains.

5. A method for the disposal of waste cutting liquid consisting essentially of an emulsion of partly soluble oils and water, said method comprising the steps of:

supplying said liquid near a first side of a shallow storage vessel, the surface of the liquid contained in said vessel defining a large free surface in direct contact with air for preliminary evaporation, circulating a flow of air above said surface of said vessel from said first side of the vessel to cause a mechanical entrainment of the oily phase of said liquid whereby a curved interface between a more especially oily phase and a more especially emulsified phase is established in the liquid contained in said vessel, flowing the aqueous emulsified phase of said liquid from the bottom of said vessel to the top of an evaporator tower, causing said liquid to flow through the evaporation tower in a thin trickling stream submitted to a transverse current of hot air maintained at a temperature which will not evaporate the most volatile oily constituents of said liquid, said liquid remaining at a temperature below the evaporation temperature of the most volatile oily constituents thereof, whereby said air is only charged with water vapor and may be directly discharged in the atmosphere.

centrifuging the liquid collected at the bottom of said evaporation tower, delivering the oily phase of the liquid from the shallow storage vessel to the bottom of a settling tank system, leaving said liquid in said settling tank system to remove insoluble oils by decantation, flowing said insoluble oils from the surface of the liquid in said settling tank system to slightly below the free liquid surface of said shallow vessel near the opposite side of said first side of said vessel, recycling the liquid from the lower part of said settling tank system to the top of said evaporation tower, delivering the liquid collected from the free liquid surface of said shallow vessel near said opposite side to a treating device for separating the solid residues and tars from the combustible products, burning said combustible products, and producing said current of hot air from heat produced from burning said combustible products.

6. A method as defined in claim 5 in which said liquid is caused to flow in the form of a plurality of liquid curtains above the liquid surface of said shallow vessel said liquid curtains being substantially perpendicular to said flow of air.

7. Apparatus for use in facilitating the disposal of waste cutting liquid consisting essentially of an emulsion of partly soluble oils and water, said apparatus including an evaporation tower, said evaporation tower comprising a series of plates, means mounting said plates one beneath the other with said plates alternately inclined in opposite directions to the horizontal to permit a trickling zig-zag flow of said cutting liquid over said plates from a top plate in said series to a bottom plate in said series, means for supplying said liquid to said top plate, said means for supplying liquid to said top plate includes a storage vessel, means defining an open top of said storage vessel, said storage vessel having a length, a width and a depth, said length and said width being large compared with said depth, means for supplying liquid to said storage vessel and means for transferring said liquid from said storage vessel to said top plate, said storage vessel acting to stabilize the flow of said liquid to said top plate and said storage vessel being operative to cause water to be evaporated into the atmosphere from the surface of said liquid in said vessel, said means for supplying liquid including decanting means, said decanting means including a plurality of tanks, means connecting said tanks together in series, an outlet pipe leading from a lower part of each of said tanks into an adjacent tank in said series, each of said pipes discharging into said adjacent tank at a level below the surface level of liquid which exists in said tank when said decanting means is in operation, means for supplying said liquid to a first tank in said series and pumping means having a plurality of inlets, one of said inlets being disposed at the level of the surface of said liquid in each of said tanks to decant insoluble oil from said surface of said liquid in said tank, said means for supplying said liquid to said top plate also including a channel extending across said evaporation tower, said channel having a first side and a second side, means defining a plurality of notches spaced apart along said first side, and means for supplying said liquid to said channel adjacent said second side thereof whereby said liquid overflows through said notches on to said top plate, means for producing a current of hot air at a temperature of from 80° to 250° C. and means for flowing said current of hot air over the surface of said trickling flow of liquid over said plates, said means for flowing said current of hot air including blower means, means communicating said blower means with an upper part of said evaporation tower to blow said air in a direction transverse to that of said trickling flow of liquid over said plates, manifold means in said tower to reverse the direction of transverse flow of said air and cause said air to flow to and fro across said tower, and means for removing said air containing evaporated water from a lower part of said tower, a device for separating solid residues and tars from said liquid, means communicating said bottom plate of said tower to said device, said means for producing a current of hot air including a burner associated with said blower means, means for supplying liquid from said device to said burner and means for flowing hot air from said burner and said blower to said evaporation tower.

8. Apparatus for use in facilitating the disposal of waste cutting liquid consisting essentially of an emulsion of partly soluble oils and water, said apparatus including an evaporation tower, said evaporation tower comprising a series of plates, means mounting said plates one beneath the other with said plates alternately inclined in opposite directions to the horizontal to permit a trickling zig-zag flow of said cutting liquid over said plates from a top plate in said series to a bottom plate in said series, means for producing a current of hot air at a temperature of from 80° to 250° C. and means for flowing said current of hot air over the surface of said trickling flow of liquid over said plates, means for supplying said liquid to said top plate, said means for supplying liquid to said top plate including a storage vessel provided with an open top, said storage vessel having a length, a width and a depth, said length and said width being large compared with said depth, means for supplying liquid from cutting machines to said storage vessel at one side of said vessel, means for transferring said liquid from said storage vessel to said top plate, said storage vessel acting to stabilize the flow of said liquid to said top plate and said storage vessel being operative to cause water to be evaporated into the atmosphere from the surface of said liquid in said vessel, a roof spaced above said storage vessel, said roof being provided with a heat-absorbing surface and a heat-radiating surface, means mounting said roof for movement of said surfaces whereby said surfaces can be adjusted in orientation in dependence upon the direction of sunlight striking said roof, two blowers mounted for producing a transverse flow of air between said roof and said top of said vessel, said blowers being mounted side by side between the top of said vessel and said roof, two pairs of trickler tanks, means mounting said trickler tanks between said top of said storage vessel and said roof, one pair of said trickler tanks being associated with each of said blowers, means mounting said pairs of tanks with said two tanks associated with one of said blowers being staggered in the direction of flow of said air between said top of said vessel and said roof relative to said pair of tanks associated with the other of said blowers, and means for supplying liquid from said storage vessel to said trickler tanks whence said liquid overflows from said tanks back into said storage vessel and thereby forms a plurality of curtains of liquid substantially normal to the flow of air between said top of said vessel and said roof, settling means, means for recirculating part of said liquid from said evaporation tower to said settling means and means for decanting insoluble oil from the surface of liquid in said settling means and recirculating said insoluble oil back to said storage vessel.

* * * * *